United States Patent
Adams et al.

(10) Patent No.: US 6,470,822 B2
(45) Date of Patent: Oct. 29, 2002

(54) INDICATING DEVICE WITH A POINTER

(75) Inventors: Jürgen Adams; Anton Kolar, both of Villingen-Schwenningen (DE); Elmar Neugart, Ladyabrand (ZA)

(73) Assignee: Mannesmann VDO AG, Frankfurt (DE)

( * ) Notice: Subject to any disclaimer, the term of this patent is extended or adjusted under 35 U.S.C. 154(b) by 17 days.

(21) Appl. No.: 09/789,423

(22) Filed: Feb. 22, 2001

(65) Prior Publication Data

US 2002/0059895 A1 May 23, 2002

(30) Foreign Application Priority Data

Feb. 23, 2000 (DE) .......................... 100 08 211
Sep. 6, 2000 (DE) .......................... 100 43 950

(51) Int. Cl.$^7$ ............................ B60Q 3/04; G01D 13/00
(52) U.S. Cl. ...................... 116/284; 116/288; 116/62.1
(58) Field of Search ................ 362/26, 28; 116/62.1, 116/62.4, 284, 285, 286, 287, 288, 300, 301, 302, 293; 368/238, 80

(56) References Cited

U.S. PATENT DOCUMENTS

| | | | | |
|---|---|---|---|---|
| 3,776,176 A | * | 12/1973 | Doyle | 116/288 |
| 5,050,045 A | * | 9/1991 | Kato et al. | 362/23 |
| 5,797,345 A | * | 8/1998 | Evans et al. | 116/286 |
| 5,878,689 A | * | 3/1999 | Sugita | 116/286 |

* cited by examiner

Primary Examiner—Diego Gutierrez
Assistant Examiner—R. Alexander Smith
(74) Attorney, Agent, or Firm—Martin A. Farber

(57) ABSTRACT

For an indicating device with a pointer, in which the pointer comprises a rotary pointer spindle 2 and a pointer vane 1 arranged radially on the pointer spindle 2, the pointer vane 1 being deflected according to a rotation of the pointer spindle 2, in addition to its ability to pivot as a result of the rotation of the pointer spindle 2, the pointer vane 1 is also rotatable about the axis 13 of its radial extent and the pointer vane 1 has at least two boundary surfaces 11a, 11b or 12a, 12b and 12c which can be distinguished from one another in their appearance.

15 Claims, 5 Drawing Sheets

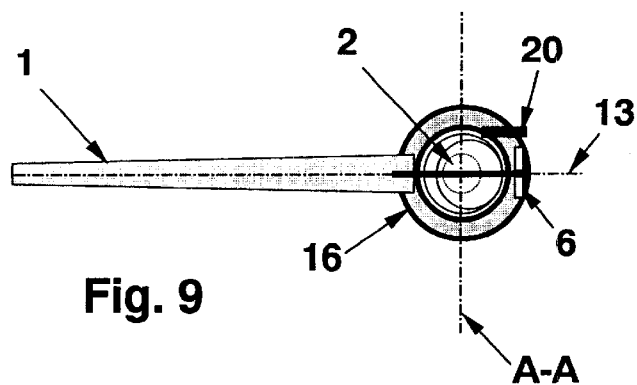
Fig. 9
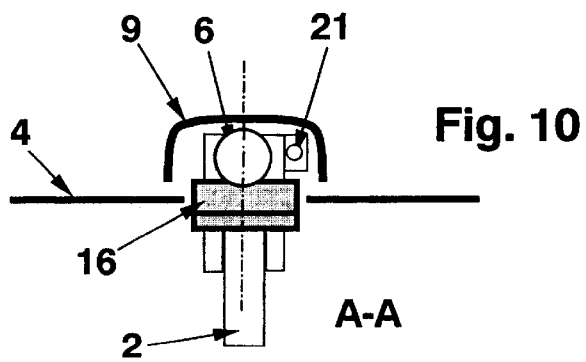
Fig. 10
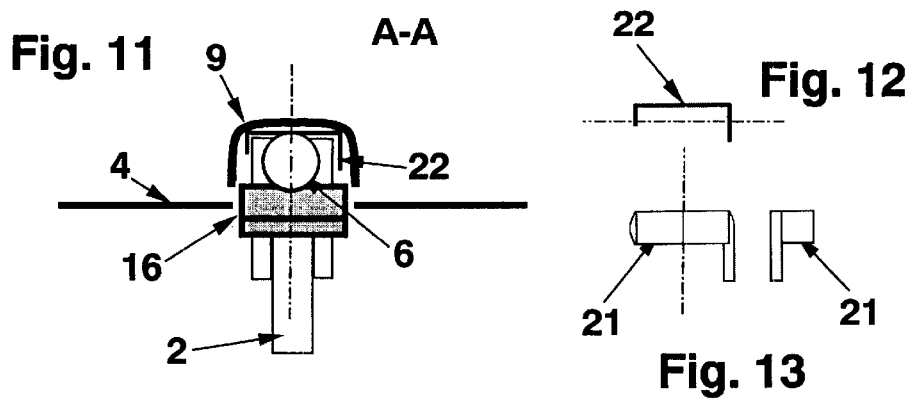
Fig. 11
Fig. 12
Fig. 13

INDICATING DEVICE WITH A POINTER

FIELD AND BACKGROUND OF THE INVENTION

The invention relates to an indicating device with a pointer. In the case of this indicating device, the pointer comprises a rotary pointer spindle and a pointer vane arranged radially on the pointer spindle, the pointer vane being deflected according to a rotation of the pointer spindle.

Indicating devices of this type are sufficiently known from various instances of use. They are to be found for example in indicating instruments in motor vehicles. In the case of these indicating devices, the pointer vane is rigidly connected to the pointer spindle. In some designs, the pointer vane is formed as a light guide and can be illuminated if need be. It has been found, however, that a pointer vane illuminated in such a way only has low contrast when there is bright ambient light and, as a consequence of this, also produces only a weak signaling effect in certain situations, so that a pointer vane of this type of design is not very well suited for reliably assuming the function of a warning device in addition to its conventional indicating function, even if light of different colors or intensities were fed into the pointer vane formed as a light guide to indicate a specific warning. Configurations of indicating devices of the generic type with a pointer vane provided with a colored coating are also known, but a signaling effect that can be used for a warning device is not in fact obtained from a pointer vane which is connected to a pointer spindle and has a permanent, unchangeable form of colored surface.

SUMMARY OF THE INVENTION

It is consequently the object of the present invention to develop further an indicating device of the introductory-mentioned type with a pointer in such a way that, in addition to its conventional indicating function, the pointer vane can be used as a warning device reliably and with an adequate signaling effect.

The object is achieved by an indicating device of the introductory-mentioned type, wherein, in addition to its ability to pivot as a result of the rotation of the pointer spindle, it is also rotatable about the axis of its radial extent and the pointer vane has at least two boundary surfaces which can be distinguished from one another in their appearance. The solution accordingly envisages that the boundary surfaces of the pointer vane are used for indicating at least two signaling states that can be clearly distinguished from one another. According to the angle of rotation of the pointer vane about the axis of its radial extent, a signaling effect consequently emanates from the boundary surfaces of the pointer vane, so that, in addition to its conventional indicating function, the pointer vane can be used as a warning device.

The indicating device may be configured in such a way that the rotation of the pointer vane about the axis of its radial extent is independent of the rotation of the pointer spindle. There is accordingly no link between the angle of rotation of the pointer spindle and the angle of rotation of the pointer vane. Such a configuration has the advantage that the function of the pointer vane as a warning device can be performed independently of the conventional indicating function of the pointer vane.

Permanently magnetic or electromagnetic actuating means are suitable in particular as the drive for rotating the pointer vane about the axis of its radial extent, because they can be realized inexpensively. At the same time, the permanently magnetic actuating means may comprise for example a two-pole actuating magnet arranged on a shaft of the pointer vane and a permanent magnet formed annularly around the pointer spindle and having at least two different polarity zones. The electromagnetic actuating means can be formed by a two-pole actuating magnet arranged on a shaft of the pointer vane and an actuating coil through which current can flow and which is formed annularly around the pointer spindle. The use of permanently magnetic actuating means is a solution which is simple and inexpensive to realize if the function of the pointer vane as a warning device is to be performed in a fixed dependence on a specific angle of rotation of the pointer spindle. If the function of the pointer vane as a warning device is to be controllable independently of the angle of rotation of the pointer spindle, electromagnetic actuating means in which the current flow through an actuating coil can be controlled in order to produce the. warning signal, constitute the adequate solution. For the structural configuration, it is. advantageous if the shaft of the pointer vane is rotatably mounted in the pointer spindle itself or in the extension thereof firmly connected to it. The shaft of the pointer vane is firmly connected to the body of the pointer vane.

To use the pointer vane as a warning device in addition to its conventional indicating function, the pointer vane may have along the axis of its radial extent at least two boundary surfaces which differ from one another in their coloring. Two significantly different colors, such as for example red and green, have the effect of providing two signaling states which can be clearly distinguished from one another and, by being assigned to the warning in an appropriately agreed fixed manner and an easy-to-interpret way, signal for example whether or not the specific warning is being given. At the same time, the at least two boundary surfaces of the pointer vane may have a different color coating. A colored coating can be realized in a simple and inexpensive way by printing techniques or by corresponding painting, provided that the material and condition of the surface of the pointer vane are suitable for such treatments. An alternative to the colored coating on the pointer vane is to form the pointer vane as a device which changes color in which the boundary surfaces of the pointer vane are provided with a fluorescent print, so that only when they are irradiated with UV light do the boundary surfaces take on a color that is changed in comparison with the unirradiated state. If the pointer vane is formed as a light guide, the boundary surfaces of the pointer vane may also be designed in such a way that light fed into the pointer vane induces a different optical impression according to the angle of rotation of the pointer vane about the axis of its radial extent, so that, for a viewer, for example either the basic color of the body of the pointer vane or the color applied: to its boundary surfaces predominates, or else the color of the light fed into the pointer vane and emerging at the boundary surfaces of the pointer vane predominates.

BRIEF DESCRIPTION OF THE DRAWINGS

The invention is now to be explained in more detail on the basis of thirteen figures of the drawings, in which FIG. 1 schematically shows the basic setup of an indicating device of the generic type, FIG. 9 shows a plan view of a pointer with an actuating magnet and an auxiliary pole, FIG. 10 shows a longitudinal section of a pointer with an actuating magnet and a pin-like auxiliary pole, FIG. 11 shows a longitudinal section of a pointer with an actuating magnet and an auxiliary pole formed as a clip, FIG. 12 shows an auxiliary pole formed as a clip as an individual part and FIG. 13 shows two details of the pin-like auxiliary pole.

DETAILED DESCRIPTION OF THE PREFERRED EMBODIMENT

Figure 1:
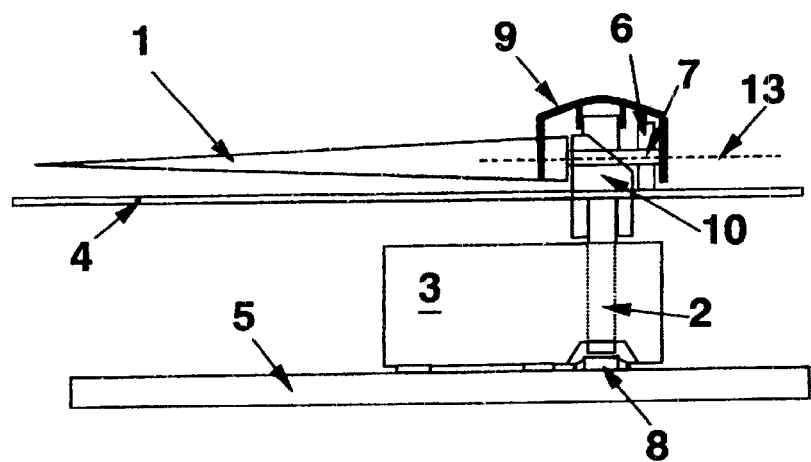

According to FIG. 1, an indicating device of the generic type has a pointer, which comprises a pointer vane 1 and a pointer spindle 2. The pointer vane 1 is connected to the pointer spindle 2 in such a way that a rotation of the pointer spindle 2 deflects the pointer vane 1 over a dial 4 or a scale, whereby the pointer vane 1 performs its conventional indicating function. The pointer spindle 2 may be driven, for example, by a stepping motor 3 or some other suitable drive. The stepping motor 3 and its electronic activation are generally mounted on a printed-circuit board 5. For applications in a motor vehicle, the pointer spindle 2 is usually of a light-conducting form and a light-emitting diode 8 or some other lighting means is placed on the printed-circuit board 5 in such a way that light emitted from this lighting means is fed into the pointer spindle 2. This light is then passed into the pointer vane 1 through a prism head 10 attached to the pointer spindle 2, in order to illuminate the pointer vane 1. A pointer cap 9 covers the pointer spindle 2 on the front side. The pointer vane 1 has at its one end a shaft 7 which is firmly connected to the pointer vane 1, is preferably produced from steel and is rotatably mounted in the pointer spindle 2, preferably in the prism head 10. According to the invention, an at least two-pole actuating magnet 6 is also attached to the shaft 7 in order to help, along with the means shown in FIGS. 2 to 5, to bring about a rotational movement of the pointer vane 1 about the axis 13 of its radial extent and the holding of the pointer vane 1 in a stable position with respect to the dial 4 serving as a reference plane. The actuating magnet 6 may comprise, for example, an annular or disk-shaped plastic-bonded permanent magnet in which magnetic poles are impressed at suitable points.

Figure 2:
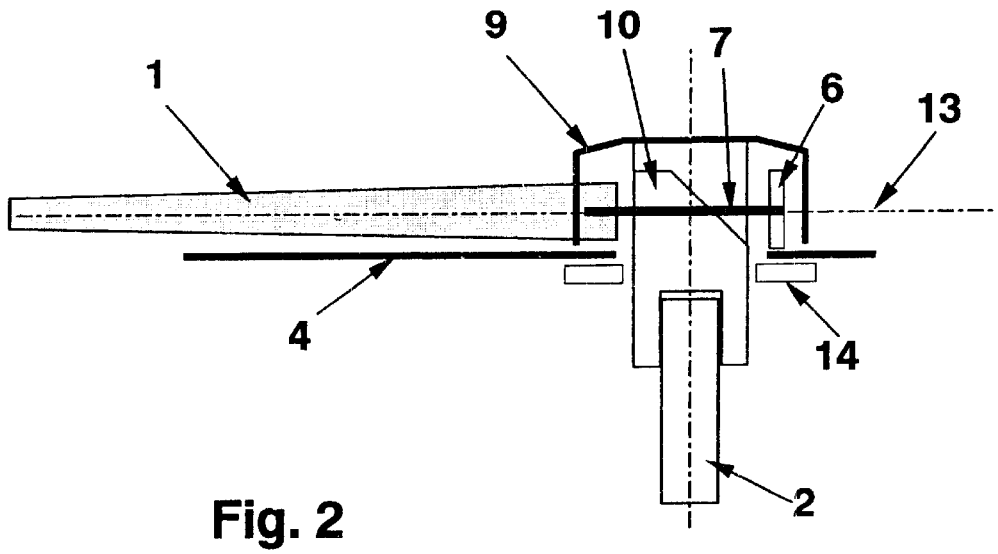
FIG. 2 shows a longitudinal section of a pointer with permanently magnetic actuating means for the pointer vane.
Figure 3:
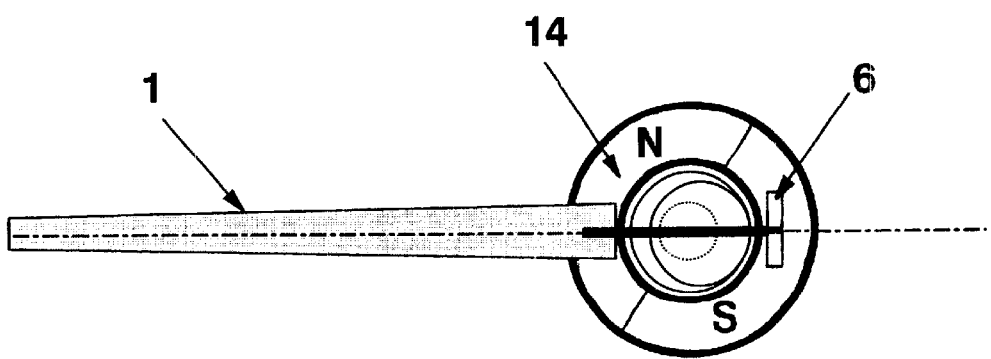
FIG. 3 shows a plan view of a pointer with permanently magnetic actuating means for the pointer vane.

FIGS. 2 and 3 show sectional representations of a pointer with permanently magnetic actuating means for the pointer vane 1. To supplement FIG. 1, a permanent magnet 14 which encloses the pointer spindle 2 in an annular manner and has at least two differently magnetized segments N and S is shown. One segment with magnetization as a magnetic north pole N and one segment with magnetization as a magnetic south pole S are represented. If the pointer 1 is then moved by the actuating magnet 6 attached to the shaft 7—said magnet being driven by the pointer spindle 2—over the annular permanent magnet 14, the pointer vane 1 pivots through 180° about the axis 13 of its radial extent, as a result of the magnetic forces existing between the actuating magnet 6 and the permanent magnet 14, as soon as the actuating magnet 6 is moved from one segment region N to the other segment region S. As long as the actuating magnet 6 is in operative connection with one segment region or the other, the pointer vane 1 remains at a specific defined angle of rotation with respect to the axis 13 of its radial extent on account of the magnetic forces of attraction. In this way, the pointer vane 1 can perform the function of a warning device at that position of the angle of rotation of the pointer spindle 2 which is defined by the boundary surfaces of the two segment regions N and S, since the pointer vane 1 has two boundary surfaces which can be distinguished from one another in their appearance. The change in the appearance can be brought about by the upper side and underside of the pointer vane 1 being differently colored. This configuration of the invention is of interest for example in conjunction with indicating devices designed as speedometers, if danger, or the departure from a permissible operating range, is to be signaled as. from a specific speed indication.

As an alternative to the permanently magnetic actuating means described here for the pointer vane 1, purely mechanical solutions can also be realized if the only concern is to rotate the pointer vane 1 about the axis 13 of its radial extent when there is a specific angle of rotation of the pointer spindle 2. Mechanical solutions of this type can be formed for example by a gearwheel arrangement and follower constructions which work in a way similar to a roller-type counter.

Figure 4:
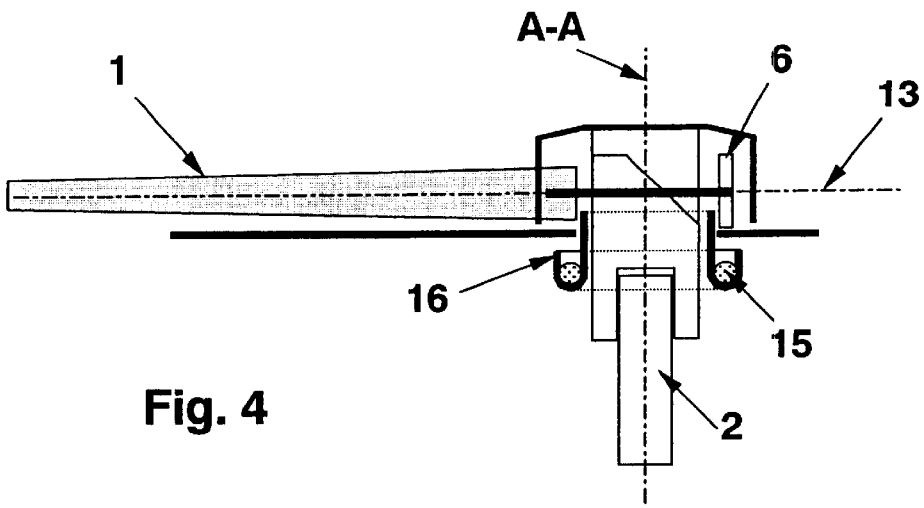
FIG. 4 shows a longitudinal section of a pointer with electromagnetic actuating means for the pointer vane.
Figure 5:
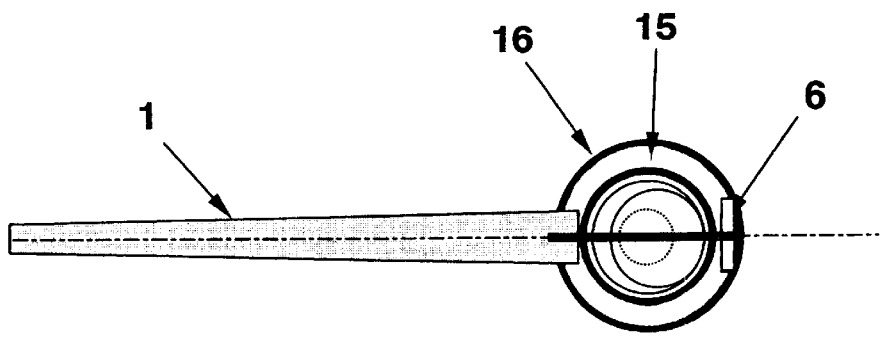
FIG. 5 shows a plan view of a pointer with electromagnetic actuating means for the pointer vane, FIG. 6 perspectively shows a pointer vane with two boundary surfaces, FIG. 7 perspectively shows a pointer vane with three boundary surfaces.
Figure 8A:
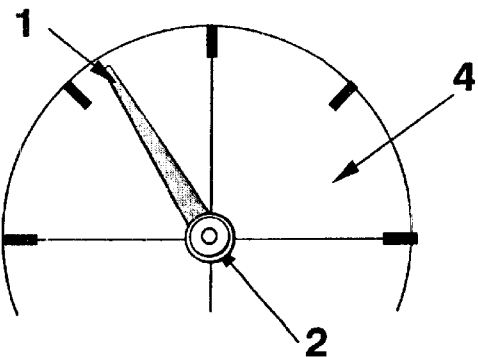
FIGS. 8A to 8D show a series of pictures depicting how the pointer vane appears at four different angles of rotation of the pointer spindle.
Figure 8B:
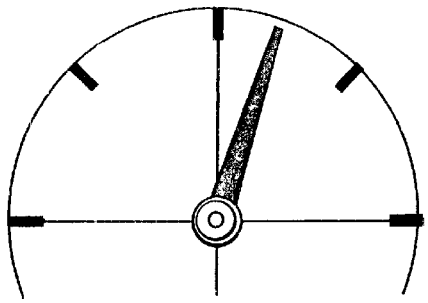
Figure 8C:
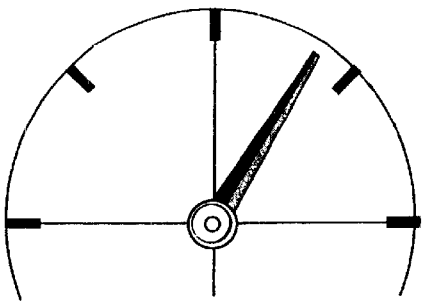
Figure 8D:
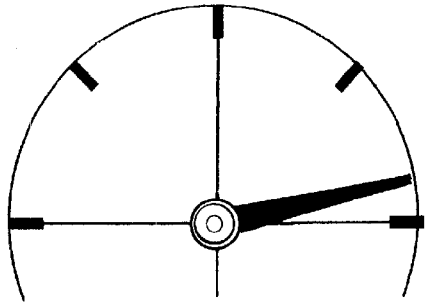

Sectional representations of a pointer with electromagnetic actuating means for the pointer vane 1 are shown in FIGS. 4 and 5. In this case, the pointer essentially comprises the same components as in the case of the exemplary embodiment according to FIGS. 2 and 3. The only difference is that an actuating coil 15 through which. current can flow and which encloses the pointer spindle 2 in an annular manner is provided under the dial 4 instead of the permanent magnet 14, the actuating coil 15 being mounted in a pole guiding ring 16 which guides the magnetic field generated by the current flow in the direction of the two-pole actuating magnet 6 when current is made to flow through the actuating coil 15. The actuating coil 15 is connected to an electronic control circuit, which is not shown however in FIGS. 4 and 5. This control circuit can be used to influence the magnetic field between the actuating coil 15 and the actuating magnet 6, so that the pointer vane 1 can be rotated about the axis 13 of its radial extent and held in a specific position by the magnetic forces acting on the actuating magnet 6. This rotational movement is independent of the rotation of the pointer vane 1 about the pointer spindle 2.

Figure 6:
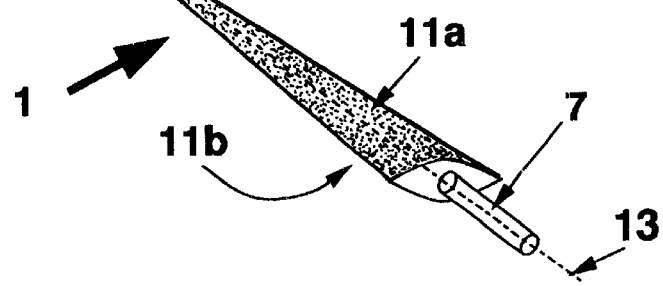
Figure 7:
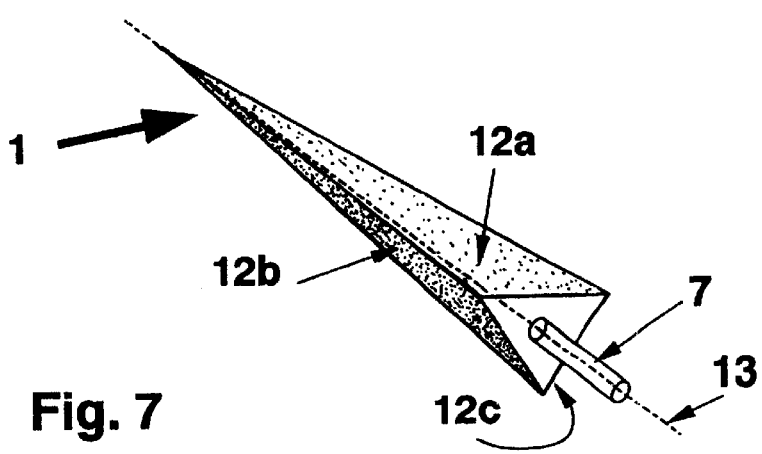

Exemplary embodiments of a pointer vane 1 are represented in FIGS. 6 and 7. FIG. 6 thus perspectively shows a pointer vane 1 with two boundary surfaces 11a and 11b lying opposite one another. FIG. 7 perspectively shows a pointer vane with three boundary surfaces 12a, 12b and 12c, which in this example are arranged in relation to one another in such a way that the cross section of the body of the pointer vane. 1 forms an equilateral triangle. By rotation of the pointer vane 1 about the axis 13 of its radial extent, at least one of the boundary surfaces 11a, 11b or 12a, 12b and 12c is respectively made to face the viewer. If the boudary surfaces 11a, 11b or 12a, 12b and 12c are made to differ from one another in their appearance by color printed finishes, different signaling effects can emanate from the boundary surfaces 11a, 11b or 12a, 12b and 12c of the pointer vane 1 according to the angle of rotation about the axis 13.

FIGS. 8A, 8B, 8C and 8D show what the pointer vane 1 looks like at four different angles of rotation of the pointer spindle 2. While the pointer vane 1 moves clockwise over the dial 4, with the pointer vane 1 being driven by the pointer spindle 2, at specific angular positions of the pointer spindle 2 the pointer vane 1 changes its appearance with respect to the boudary surface facing a viewer, in this example the pointer vane 1 being formed with three boundary surfaces in a way corresponding to FIG. 7. As a result, in addition to the conventional indicating function of the pointer vane 1, further information can be imparted to the viewer by the pointer vane 1 reliably and with a good signaling effect. The formation of the pointer vane 1 with three boundary surfaces has the advantage that a defined item of information, for example that a measuring parameter is threatening to leave a permissible operating range, can be imparted to the viewer also by the transitional regions, in which two boundary surface [sic] are simultaneously visible in a way corresponding to the representation in FIG. 8C. To sum up, these figures show how, according to its pointer position, a pointer vane 1 imparts supplementary information to a viewer that is perceptible with a good level of quality.

In the part of the description of the invention which now follows, a further development of the solution so far discussed is described. The starting. point of this development is an indicating device with a pointer,
a) the pointer comprising a rotatable pointer spindle 2 and a pointer vane 1 arranged radially on the pointer spindle 2,
b) the pointer vane 1 being deflected according to a rotation of the pointer spindle 2,
c) in addition to its ability to pivot as a result of the rotation of the pointer spindle 2, the pointer vane 1 is also rotatable about the axis 13 of its radial extent and the pointer vane 1 has at least two boundary surfaces 11a, 11b or 12a, 12b and 12c which can be distinguished from one another in. their appearance,.
d) electromagnetic actuating means being provided for rotating the pointer vane 1 about the axis 13 of its radial extent
e) and the electromagnetic actuating means comprising an at least two-pole permanently magnetic actuating magnet 6 arranged on a shaft 7 of the pointer vane 1 and an actuating coil 15 through which current can flow and which is formed annularly around the pointer spindle 2.

As already explained above, the pointer vane is rotated about the axis of its radial extent by means of a shaft mounted in the pointer spindle in such a way that, by making a current which can be controlled according to requirements flow through an actuating coil annularly formed around the pointer spindle, a magnetic field is formed between the actuating coil and an actuating magnet fastened to the pointer vane, and the boundary surfaces of the pointer vane assume a defined position on the basis of magnetic forces of attraction or repulsion, so that a particular one of these boundary surfaces is made to face a viewer of the indicating device, whereby a specific warning can be given to the viewer by the appearance of the pointer vane assigned to this boundary surface.

If the actuating coil and the pole guiding ring in which the actuating coil is mounted are formed with precision, the magnetic field required for the rotation of the pointer vane is largely symmetrical. As a consequence, a relatively strong magnetic field is required for the rotation of the pointer vane to make an adequately great torque act on the actuating magnet in order for the latter to begin rotating together with the pointer vane rigidly connected to it via the shaft. This is so because the torque resulting from the magnetic field must also be used to overcome the unavoidable bearing friction of the shaft in the pointer spindle. This fact is also changed little if it is assumed that in practice the magnetic field between the actuating coil and the actuating magnet is slightly distorted as a result of production and arrangement tolerances.

In order to increase the torque which is required for the rotation of the pointer vane and is to be produced by the magnetic field between the actuating coil and the actuating magnet, it is now proposed in this development that at least one ferromagnetic auxiliary pole is provided, by which the magnetic field forming between the actuating coil and the actuating magnet is unsymmetrically deformed in such a way that even relatively small forces from the magnetic field can set the actuating magnet, resting in a specific position of equilibrium, into a rotational movement. This field distortion induced by the ferromagnetic auxiliary pole accordingly helps to avoid large pulsed currents or excessive currents in the. actuating coil in order to produce the starting torque required for the rotation of the pointer vane. At the same time, the auxiliary pole is arranged in relation to the actuating magnet in such a way that the permanently magnetic field of the actuating magnet can act on the auxiliary pole with adequate intensity.

A two-pole actuating magnet assumes two specific angular positions with respect to the actuating coil, denoted here by way of example by $\phi1=0°$ and $\phi2=180°$. A current surge in the actuating coil allows a torque to be exerted on the shaft of the pointer vane, so that the latter begins to rotate, until an equilibrium is restored between the forces of attraction and repulsion resulting from the magnetic field. The field of the permanently magnetic poles of the actuating magnet is primarily aligned towards the pole guiding ring, which leads to the actuating magnet pivoting into a stable holding position after each half revolution. The flow of current through the actuating coil can accordingly be switched off as soon as the starting torque has been applied for the shaft of the pointer vane. An auxiliary pole arranged in the spatial vicinity of the actuating magnet then reduces the current required for generating the starting torque by the field distortion brought about by it. This arrangement for an indicating device of the generic type consequently has a favourable electrical energy balance.

With continuous currents of different strength flowing in the actuating coil, different angles of rotation can also be set for the pointer vane, while also allowing for the magnetic field influenced by the auxiliary pole. For example, when there is no current flowing through the actuating coil, the pointer vane may assume the angle of rotation $\alpha=0°$. At the current strength of +I, the pointer vane may then rotate—starting from its position of rest with the angle of rotation of $\alpha=0°$—by the angle of rotation $\beta=+120°$ and, if the current strength –I is set by changing the direction of flow, by the angle of rotation $\gamma=-120°$. In this way, a pointer vane formed with three boundary surfaces can be rotated in 120° steps.

On the basis of FIGS. 1, 4 and 5 already discussed, the proposed development is now to be explained in more detail essentially by referring to FIGS. 9 to 13.

In FIG. 9, an auxiliary pole 20 has been added to the the arrangement shown in FIG. 5. The auxiliary pole 20 consists of a ferromagnetic material and consequently has a relative permeability $\mu_r>1$. The actuating magnet 6 and auxiliary pole 20 are arranged in relation to one another in such a way that the permanently magnetic field of the actuating magnet 6 can extend with adequate magnetic field strength to the ferromagnetic auxiliary pole 20.

FIG. 10 shows in a sectional plane A—A a pointer with an actuating magnet 6 and an auxiliary pole 20, formed as a pin 21 or bar, the auxiliary pole 20 being positioned in such a way that it is approximately the same distance away from the actuating magnet 6 and from the pole guiding ring 16. The distance is in this case approximately between one and two times the diameter of the pin 21. The position of the sectional plane A—A can also be seen in conjunction with the previously explained FIGS. 4 and 9.

FIG. 11 shows in the sectional plane A—A a pointer with an actuating magnet 6 and an auxiliary pole 20 formed as a clip 22. This clip 22 may be produced as a punched/bent part of a ferromagnetic material or be made to engage in the pointer cap 9 or over the prism head 10 or adhesively attached there. In FIG. 12, this clip 22 is represented as an individual part, as a bow of a ferromagnetic material. A further design of the auxiliary pole 20 may also consist in that the pointer cap 9 is doped with metal fibers of a ferromagnetic material and shaped specifically towards the actuating magnet 6 in an appropriate way, so that the auxiliary pole 20 becomes an integral part of the pointer cap 9. The pointer cap 9 could thus also be formed as a ferromagnetic deep-drawn part with a suitable geometry. FIG. 13 shows a longitudinal view and a rear view of an auxiliary pole 20 formed as a pin 21 or bar.

We claim:

1. Indicating device with a pointer, the pointer comprising a rotary pointer spindle (2) and a pointer vane (1) arranged radially on the pointer spindle (2), the pointer vane (1) being deflected according to a rotation of the pointer spindle (2), wherein, in addition to its ability to pivot as a result of rotation of the pointer spindle (2), the pointer vane (1) is also rotatable about an axis (13) of its radial extent and the pointer vane (1) has at least two boundary surfaces (11a, 11b or 12a, 12b and 12c) which are distinguishable from one another in their appearance.

2. Indicating device according to claim 1, wherein rotation of the pointer vane (1) about the axis (13) of its radial extent is independent of the rotation of the pointer spindle (2).

3. Indicating device according to claim 1, further comprising permanently magnetic or electromagnetic actuating means for rotating the pointer vane (1) about the axis (13) of its radial extent.

4. Indicating device according to claim 3, wherein the permanently magnetic actuating means comprise a two-pole actuating magnet (6) arranged on a shaft (7) of the pointer vane (1) and a permanent magnet (14) formed annularly around the pointer spindle (2) and having at least two different polarity zones (N, S).

5. Indicating device according to claim 3, wherein the electromagnetic actuating means comprise a two-pole actuating magnet (6) arranged on a shaft (7) of the pointer vane (1) and an actuating toil (15) through which current can flow and which is formed annularly around the pointer spindle (2).

6. Indicating device according to claim 5, further comprising at least one ferromagnetic auxiliary pole (20), by which a magnetic field forming between the actuating coil (15) and the actuating magnet (6) is unsymmetrically deformed such that even relatively small forces from the magnetic field can set the actuating magnet (6), resting in a specific position of equilibrium, into a rotational movement.

7. Indicating device according to claim 6, wherein the auxiliary pole (20) is formed as a pin (21) or bar.

8. Indicating device according to claim 7, wherein the auxiliary pole (20) is positioned that it is approximately a same distance away from the actuating magnet (6) and from a pole guiding ring (16), the distance being approximately between one and two times the diameter of the pin (21).

9. Indicating device according to claim 6, wherein the auxiliary pole (20) is formed as a clip (22) or bow.

10. Indicating device according to claim 9, wherein the clip (22) or bow is a punched/bent part and engages in a pointer cap (9) or over a prism head (10) or is adhesively attached there.

11. Indicating device according to claim 10, wherein the auxiliary pole (20) is an integral part of the pointer cap (9).

12. Indicating device according to claim 1, wherein a shaft (7) of the pointer vane (1) is rotatably mounted in the pointer spindle (2) itself or in extension thereof firmly connected thereto.

13. Indicating device according to claim 1, wherein the pointer vane (1) has along the axis (13) of its radial extent said at least two boundary surfaces (11a, 11b) which differ from one another in their coloring.

14. Indicating device according to claim 13, wherein the at least two boundary surfaces (11a, 11b) of the pointer vane (1) have a different color coating.

15. Indicating device according to claim 13, wherein the pointer vane (1) is formed as a device which changes color in which the boundary surfaces (11a, 11b or 12a, 12b and 12c) of the pointer vane (1) are provided with a fluorescent print, so that only when they are irradiated with UV light do the boundary surfaces (11a, 11b or 12a, 12b and 12c) take on a color that is changed in comparison with their unirradiated state.

* * * * *